(12) United States Patent
Matsumoto

(10) Patent No.: US 11,887,268 B2
(45) Date of Patent: Jan. 30, 2024

(54) INFORMATION DISPLAY DEVICE, INFORMATION DISPLAY METHOD, AND INFORMATION DISPLAY PROGRAM

(71) Applicant: FUJIFILM Corporation, Tokyo (JP)

(72) Inventor: Kazuma Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 44 days.

(21) Appl. No.: 17/572,783

(22) Filed: Jan. 11, 2022

(65) Prior Publication Data

US 2022/0130129 A1   Apr. 28, 2022

Related U.S. Application Data

(63) Continuation of application No. PCT/JP2020/021338, filed on May 29, 2020.

(30) Foreign Application Priority Data

Jul. 22, 2019   (JP) ................. 2019-134584

(51) Int. Cl.
*G06T 19/20* (2011.01)
*G06T 7/70* (2017.01)
(Continued)

(52) U.S. Cl.
CPC ............ *G06T 19/20* (2013.01); *G06F 3/0482* (2013.01); *G06T 7/70* (2017.01); *G06T 17/00* (2013.01);
(Continued)

(58) Field of Classification Search
CPC .......... G06T 19/20; G06T 7/70; G06T 17/00; G06T 2200/04; G06T 2200/24; G06T 2219/2016; G06F 3/0482
See application file for complete search history.

(56) References Cited

U.S. PATENT DOCUMENTS

2018/0180511 A1   6/2018   Takamori et al.

FOREIGN PATENT DOCUMENTS

JP   2002-042172 A   2/2002
JP   2003-242524 A   8/2003
(Continued)

OTHER PUBLICATIONS

Gube ("Module Tabs in Web Design: Best Practices and Solutions", 2009, https://www.smashingmagazine.com/2009/06/module-tabs-in-web-design-best-practices-and-solutions/) (Year: 2009).*

(Continued)

*Primary Examiner* — Xin Sheng
(74) *Attorney, Agent, or Firm* — Studebaker & Brackett PC

(57) ABSTRACT

The information display device according to a first aspect includes a storage unit that stores a three-dimensional model of a structure and damage information of each management section of the structure in association with each other; a first display control unit that causes a display device to display the damage information in a form of a list; an acceptance unit that accepts selection of the damage information that is displayed in the form of the list; a management section determining unit that determines a three-dimensional position on the three-dimensional model, the three-dimensional position corresponding to the damage information for which the selection is accepted, and determines a management section including the determined three-dimensional position; and a second display control unit that causes the display device to display an area of the three-dimensional model including at least the determined management section in a manner that the three-dimensional position is distinguishable.

17 Claims, 16 Drawing Sheets

(51) Int. Cl.
*G06F 3/0482* (2013.01)
*G06T 17/00* (2006.01)
(52) U.S. Cl.
CPC ...... *G06T 2200/04* (2013.01); *G06T 2200/24* (2013.01); *G06T 2219/2016* (2013.01)

(56) References Cited

FOREIGN PATENT DOCUMENTS

| JP | 2006-244335 | A |   | 9/2006 |
|----|-------------|---|---|--------|
| JP | 2006244335  | A | * | 9/2006 |
| JP | 2019-049951 | A |   | 3/2019 |
| JP | 2019049951  | A | * | 3/2019 |
| WO | 2017/043275 | A1 |  | 3/2017 |

OTHER PUBLICATIONS

International Search Report issued in PCT/JP2020/021338; dated Aug. 25, 2020.
International Preliminary Report On Patentability issued in PCT/JP2020/021338; completed Sep. 8, 2021.
An Office Action; "Notice of Reasons for Refusal," mailed by the Japanese Patent Office dated Mar. 7, 2023, which corresponds to Japanese Patent Application No. 2021-534573 and is related to U.S. Appl. No. 17/572,783; with English language translation.

* cited by examiner

FIG. 6

| MEMBER | TYPE OF DAMAGE | SIZE OF DAMAGE | DEGREE OF DAMAGE |
|---|---|---|---|
| PIER | CRACK | L=1.0 m | a |
| PIER | CRACK | L=2.1 m | b |
| PIER | FREE LIME | L=0.5 m | c |
| DECK SLAB | FREE LIME | L=1.0 m | d |
| DECK SLAB | PEELING | S=1.0 m² | a |
| MAIN GIRDER | EXPOSURE OF STEEL REINFORCEMENT | L=0.5 m | d |
| MAIN GIRDER | FLAKING | — | d |
| ABUTMENT | PEELING | S=0.5 m² | d |
| ABUTMENT | WATER LEAKAGE | L=3 m | a |
| MAIN GIRDER | CORROSION | S=3 m² | c |

FIG. 7

TYPE OF DAMAGE
PART/MEMBER
DEGREE OF DAMAGE
INFORMATION ACQUISITION DATE AND TIME

ASCENDING ORDER
DESCENDING ORDER
OR MORE
OR LESS

OK
CANCEL

FIG. 8

| MEMBER | TYPE OF DAMAGE | SIZE OF DAMAGE | DEGREE OF DAMAGE |
|---|---|---|---|
| PIER | FREE LIME | L=0.5 m | c |
| MAIN GIRDER | CORROSION | S=3.0 m² | c |
| DECK SLAB | FREE LIME | L=1.0 m | d |
| MAIN GIRDER | EXPOSURE OF STEEL REINFORCEMENT | L=0.5 m | d |
| MAIN GIRDER | FLAKING | — | d |
| ABUTMENT | PEELING | S=0.5 m² | d |

FIG. 9

| DAMAGE ID | CLASSIFICATION | IMAGE FILE | MANAGEMENT SECTION | | REPRESENTATIVE POINT |
| --- | --- | --- | --- | --- | --- |
| | | | MEMBER | SECTION | |
| 0001 | CRACK | /../image0001.jpg | DECK SLAB | COFFER 0001 | (X1, Y1, Z1) |
| 0002 | CRACK | /../image0002.jpg | DECK SLAB | COFFER 0001 | (X2, Y2, Z2) |
| 0003 | PEELING | /../image0003.jpg | DECK SLAB | COFFER 0002 | (X3, Y3, Z3) |
| ... | | | | | |
| 0123 | CRACK | /../image0123.jpg | PIER | PIER 0011 | (X4, Y4, Z4) |
| ... | | | | | |

INFORMATION DISPLAY DEVICE, INFORMATION DISPLAY METHOD, AND INFORMATION DISPLAY PROGRAM

CROSS-REFERENCE TO RELATED APPLICATIONS

This application is a Continuation of PCT International Application No. PCT/JP2020/021338 filed on May 29, 2020, which claims priority under 35 U.S.C § 119(a) to Japanese Patent Application No. 2019-134584 filed on Jul. 22, 2019. Each of the above application(s) is hereby expressly incorporated by reference, in its entirety, into the present application.

BACKGROUND OF THE INVENTION

1. Field of the Invention

The present invention relates to an information display device, an information display method, and an information display program for displaying a three-dimensional model of a structure.

2. Description of the Related Art

In recent years, regarding equipment called "social infrastructure" of a structure (e.g., bridge, road, or building), development of a three-dimensional viewer that displays a three-dimensional model of the structure has been in progress. With such a three-dimensional viewer, for example, a user can recognize members that constitute the structure, attach an image or a damage figure, or refer to information attached to a member. For example, JP2003-242524A describes changing the perspective of three-dimensional viewing by setting the position and direction of the perspective on a plan view of a structure.

SUMMARY OF THE INVENTION

With the above technique of the related art, such as JP2003-242524A, an operation for a member of interest on a three-dimensional model or an operation of setting an easy-to-observe perspective (e.g., moving, enlarging, or rotating the model) is difficult, and it has been difficult to check a part of interest.

The present invention has been made in view of the above circumstances, and an object thereof is to provide an information display device, an information display method, and an information display program with which the position of damage of interest can be quickly and easily grasped on a three-dimensional model.

In order to achieve the above object, an information display device according to a first aspect of the present invention includes a storage unit that stores a three-dimensional model of a structure and damage information of each management section of the structure in association with each other; a first display control unit that causes a display device to display the damage information in a form of a list; an acceptance unit that accepts selection of the damage information that is displayed in the form of the list; a management section determining unit that determines a three-dimensional position on the three-dimensional model, the three-dimensional position corresponding to the damage information for which the selection is accepted, and determines a management section including the determined three-dimensional position; and a second display control unit that causes the display device to display an area of the three-dimensional model including at least the determined management section in a manner that the three-dimensional position is distinguishable.

According to the first aspect, the damage information is displayed in the form of the list, the three-dimensional position corresponding to the selected damage information is determined, the management section of the three-dimensional model is determined, and the area including the determined management section is displayed in a manner that the three-dimensional position is distinguishable. Thus, a user can quickly and easily grasp the position of damage of interest on the three-dimensional model.

In the first aspect, the "management section" is an area serving as a unit for conserving or inspecting the structure. The "position" of damage may be a representative position of damage (e.g., a start point, an end point, the center, a tip point, a point on an edge, or the like). Note that, as examples of the "structure", a building, a bridge, a tunnel, a dam, a pavement, piping, or the like can be given.

In an information display device according to a second aspect, in the first aspect, the second display control unit causes the area to be displayed in a first display state where the three-dimensional position and/or the area is displayed in a distinguishable manner and/or in a second display state where a perspective position and/or a line-of-sight direction for the three-dimensional position is controlled. The second aspect defines a specific aspect for making the determined three-dimensional position distinguishable. Either one of the first display state and the second display state may be used, or both may be used at the same time.

In an information display device according to a third aspect, in the second aspect, the second display control unit causes an index indicating the three-dimensional position and/or the area to be displayed on the three-dimensional model in a superposed manner in the first display state. According to the third aspect, a user can easily view and distinguish the position of the selected damage.

In an information display device according to a fourth aspect, in the second or third aspect, the second display control unit causes the three-dimensional model to be displayed by using a perspective position and a line-of-sight direction facing the three-dimensional position in the second display state. According to the fourth aspect, since the perspective position and the line-of-sight direction for the three-dimensional model face the determined three-dimensional position (the position of the selected damage information), a user can accurately check the position of the damage on the three-dimensional model.

In an information display device according to a fifth aspect, in any one of the second to fourth aspects, the second display control unit causes, in the first display state and/or the second display state, the three-dimensional model to be enlarged, shrunk, translated, or rotated on the basis of the three-dimensional position. Thus, a user can easily check the position of desired damage on the three-dimensional model.

In an information display device according to a sixth aspect, in any one of the first to fifth aspects, the first display control unit causes the damage information to be displayed in a first display region of the display device, and the second display control unit causes the three-dimensional model to be displayed in a second display region of the display device. According to the sixth aspect, a user can check the damage information and the three-dimensional model in parallel. Note that the first display region and the second display region may be provided in a single display device, or a plurality of display devices may be used individually as the first display region and the second display region.

An information display device according to a seventh aspect further includes, in any one of the first to sixth aspects, a display switching unit that switches between display of the damage information caused by the first display control unit and display of the three-dimensional model caused by the second display control unit. The seventh aspect defines another aspect of display of the damage information and the three-dimensional model.

In an information display device according to an eighth aspect, in any one of the first to seventh aspects, the acceptance unit accepts a setting operation of display conditions of the list, and the first display control unit causes the display device to display the damage information satisfying the display conditions on the basis of the setting operation that is accepted.

According to the eighth aspect, a user can set desired display conditions and cause the damage information to be displayed.

In an information display device according to a ninth aspect, in the eighth aspect, the acceptance unit accepts, as the setting operation, setting of at least one of a part and/or a member of the structure, a type of damage, a degree of damage, or a date and time on and at which the damage information is acquired. According to the ninth aspect, for example, a user can set and display damage of a specific part or member, damage of a specific type, damage with a certain degree or more, information acquired within a target period of time, or the like.

In an information display device according to a tenth aspect, in any one of the first to ninth aspects, the damage information is at least one of a damage image corresponding to the management section, a damage image on which information indicating damage is superposed, a damage figure, a damage number table, a repair figure, or a repair number table. The tenth aspect defines specific examples of the damage information. The damage image may be an ortho-image. In addition, the damage or repair number table may include information such as a member where damage is present, the type of damage, the size of damage, or the degree of damage.

In an information display device according to an eleventh aspect, in any one of the first to tenth aspects, the management section is at least one of a part constituting the structure, a section of an inspection unit of a member of the structure, or three-dimensional coordinates in the structure. For example, in a case where the structure is a bridge, the management section may be a pier, a deck slab, a main girder, a cross beam, or a coffer.

In an information display device according to a twelfth aspect, in any one of the first to eleventh aspects, the acceptance unit accepts designation of a three-dimensional position on the three-dimensional model, and the first display control unit causes the display device to display damage information corresponding to the three-dimensional position for which the designation is accepted. In the first to eleventh aspects, the three-dimensional model is displayed in accordance with the damage information selected by a user. In contrast, in the twelfth aspect, designation of the position on the three-dimensional model is accepted, and the damage information corresponding to the designation is displayed.

In order to achieve the above object, an information display method according to a thirteenth aspect of the present invention has a first display control step of causing a display device to display damage information of each management section of a structure in a form of a list; an acceptance step of accepting selection of the damage information that is displayed in the form of the list; a management section determining step of determining a three-dimensional position on the three-dimensional model of the structure, the three-dimensional position corresponding to the damage information for which the selection is accepted, and determining a management section including the determined three-dimensional position; and a second display control step of causing the display device to display an area of the three-dimensional model including at least the determined management section in a manner that the three-dimensional position is distinguishable. According to the thirteenth aspect, as in the first aspect, a user can quickly and easily grasp the position of damage of interest on the three-dimensional model. Note that the information display method according to the thirteenth aspect may further have substantially the same configurations as those in the second to twelfth aspects.

In order to achieve the above object, an information display program according to a fourteenth aspect of the present invention causes a computer to execute a first display control function of causing a display device to display damage information of each management section of a structure in a form of a list; an acceptance function of accepting selection of the damage information that is displayed in the form of the list; a management section determining function of determining a three-dimensional position on the three-dimensional model of the structure, the three-dimensional position corresponding to the damage information for which the selection is accepted, and determining a management section including the determined three-dimensional position; and a second display control function of causing the display device to display an area of the three-dimensional model including at least the determined management section in a manner that the three-dimensional position is distinguishable. According to the fourteenth aspect, as in the first aspect, a user can quickly and easily grasp the position of damage of interest on the three-dimensional model. Note that the information display program according to the fourteenth aspect may further have substantially the same configurations as those in the second to twelfth aspects. In addition, a non-transitory recording medium on which a computer-readable code of the program according to these aspects is recorded can also be given as an aspect of the present invention.

As described above, according to the information display device, the information display method, and the information display program according to the present invention, a user can quickly and easily grasp the position of damage of interest on the three-dimensional model.

BRIEF DESCRIPTION OF THE DRAWINGS

FIG. 6 illustrates examples in which damage information is displayed in a form of a list;

FIG. 7 illustrates a state where display conditions of the damage information are set;

FIG. 8 illustrates an example in which the damage information is sorted and displayed;

FIG. 9 illustrates a state where the damage information and three-dimensional positions are associated with each other;

DESCRIPTION OF THE PREFERRED EMBODIMENTS

Detailed description of embodiments of an information display device, an information display method, and an information display program according to the present invention is as follows. In the description, the accompanying drawings are referred to.

First Embodiment

Figure 1:
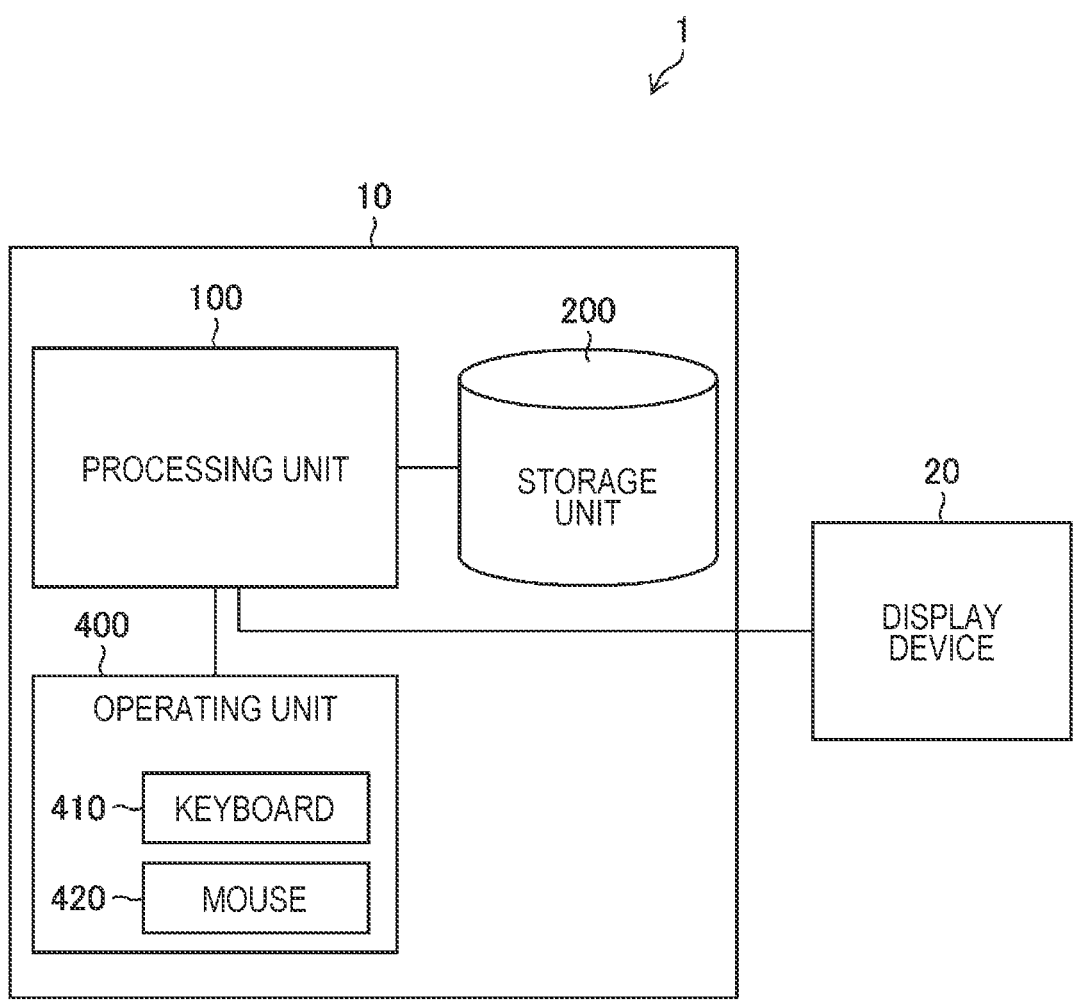
FIG. 1 illustrates the configuration of an information display system.

FIG. 1 is a block diagram illustrating the configuration of an information display system 1 according to a first embodiment. The information display system 1 includes an information display device 10 (information display device) and a display device 20 (display device). The information display device 10 includes a processing unit 100, a storage unit 200, and an operating unit 400, which are connected to one another to transmit and receive necessary information. In addition, the information display system 1 can be connected to an external server, an external database, or the like, which is not illustrated, via a communication control unit 114 (see FIG. 2) and a network, which is not illustrated, and can acquire images or damage information as necessary.

Figure 2:
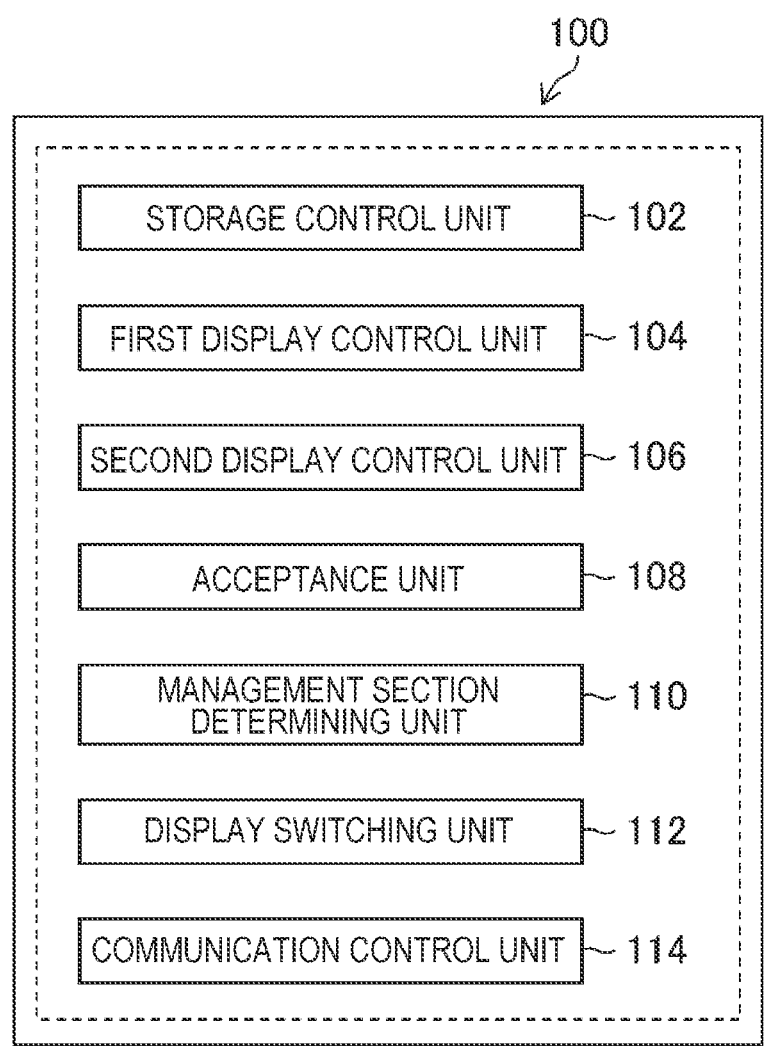
FIG. 2 illustrates a functional configuration of a processing unit.

FIG. 2 illustrates the configuration of the processing unit 100. The processing unit 100 includes a storage control unit 102 (storage control unit), a first display control unit 104 (first display control unit), a second display control unit 106 (second display control unit), an acceptance unit 108 (acceptance unit), a management section determining unit 110 (management section determining unit), a display switching unit 112 (display switching unit), and the communication control unit 114 (communication control unit). These units correspond to a storage control function, a first display control function, a second display control function, an acceptance function, a management section determining function, and a communication control function, among functions of the information display program according to the present invention. The processing unit 100 further includes a CPU (Central Processing Unit), a ROM (Read Only Memory), and a RAM (Random Access Memory), which are not illustrated. Note that these units execute processing under control of the CPU.

Functions of the above units of the processing unit 100 can be implemented by using various processors. Various processors include, for example, a CPU, which is a general-purpose processor that implements various functions by executing software (program). The above-described various processors also include a GPU (Graphics Processing Unit), which is a processor specialized in image processing, a programmable logic device (PLD), which is a processor in which the circuit configuration is changeable after manufacture, such as an FPGA (Field Programmable Gate Array), and the like. The above-described various processors further include a dedicated electric circuit, which is a processor having a circuit configuration that is specially designed to execute specific processing, such as an ASIC (Application Specific Integrated Circuit), and the like.

The function of each unit may be implemented by one processor or may be implemented by a plurality of processors of the same type or different types (for example, a plurality of FPGAs, a combination of a CPU and an FPGA, or a combination of a CPU and a GPU). In addition, a plurality of functions may be implemented by one processor. As a first example for constituting a plurality of functions with one processor, one processor may be constituted by a combination of one or more CPUs and software, and this processor may implement a plurality of functions, as typified by a computer such as a client or a server. As a second example, a processor may be used that implements the functions of the entire system with one IC (Integrated Circuit) chip, as typified by a system on chip (SoC) or the like. In this manner, various functions are constituted by one or more of the above various processors in terms of hardware configuration. More specifically, the hardware configuration of these various processors is electric circuitry constituted by combining circuit elements such as semiconductor elements.

When the above processor or electric circuitry executes software (program), a computer (for example, any of various processors or electric circuitry constituting the processing unit 100 and/or a combination thereof)-readable code of the software to be executed is stored in a non-transitory recording medium such as a ROM, and the processor refers to the software. The software stored in the non-transitory recording medium includes a program for executing the information display method according to the present invention (information display program having the first display control function, the acceptance function, the management section determining function, and the second display control function). The code of the program may also be recorded on, instead of the ROM, a non-transitory recording medium such as any magnetooptical recording device or a semiconductor memory. In the processing using software, for example, a RAM may be used as a transitory storage area, and for example, data stored in an EEPROM (Electronically Erasable and Programmable Read Only Memory), which is not illustrated, may be referred to.

Figure 3:
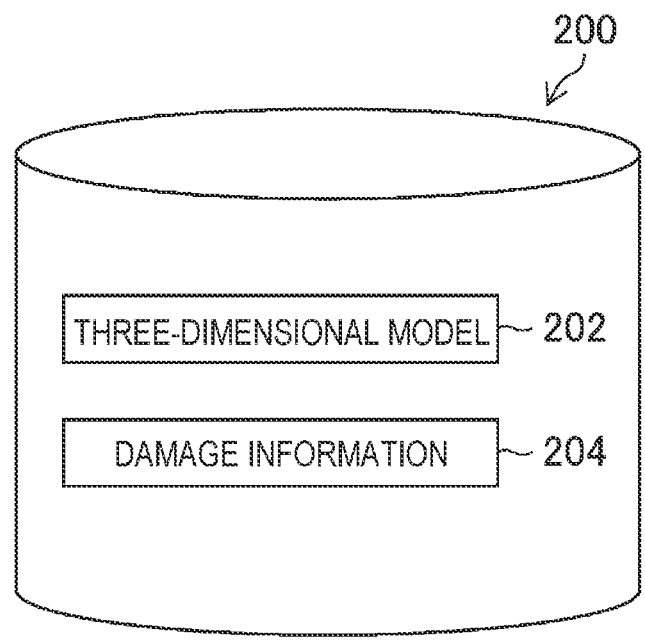
FIG. 3 illustrates information to be stored in a storage unit.

The storage unit 200 (storage unit) is constituted by a non-transitory recording medium such as a DVD (Digital Versatile Disk), a hard disk, or any semiconductor memory and a control unit thereof, and, as illustrated in FIG. 3, stores a three-dimensional model 202 (three-dimensional model) of a structure (e.g., building, bridge, road, tunnel, or dam) and damage information 204 (damage information) of each management section of the structure in association with each other. The three-dimensional model 202 indicates a three-dimensional shape of the structure, and a model representing a large number of points on a surface of the structure with a group of three-dimensional points, a model representing a surface of the structure with an aggregate of polygons (e.g., triangular patches) on the basis of the group of three-dimensional points, or a model obtained by texture mapping of a captured image (texture) of the structure on polygons can be used. The damage information 204 is at least one of a damage image corresponding to a management section, a damage image on which information indicating damage is superposed, a damage figure, a damage number table, a repair figure, or a repair number table.

<Configurations of Display Device and Operating Unit>

The display device 20 displays the damage information or the three-dimensional model of the structure under control of the information display device 10. The operating unit 400 includes a keyboard 410 and a mouse 420 as an input device or a pointing device, and a user can perform an operation necessary to execute the information display method and the information display program according to the present invention via these devices and a screen of the display device 20 (described later). The display device 20 may be constituted by a touch panel so that a user can perform operations via the touch panel.

<Processing of Information Display Method>

Now, an information display method executed by the information display system 1 having the above configuration will be described with reference to the flowchart in FIG. 4.

On the basis of a user operation via the operating unit 400, the first display control unit 104 (first display control unit, first display control function) selects information to be displayed (step S100: first display control step). Specifically, the first display control unit 104 selects pieces of damage information (which of the damage image, the damage image on which information indicating damage is superposed, the damage figure, the damage number table, the repair figure, and the repair number table is to be displayed) stored in the storage unit 200. Note that these pieces of damage information may be acquired from an external server, a storage apparatus, an imaging device, or the like via the communication control unit 114 or may be acquired via a recording medium.

<Display Damage Information in Form of List>
<Display Damage Image>

Figure 5:
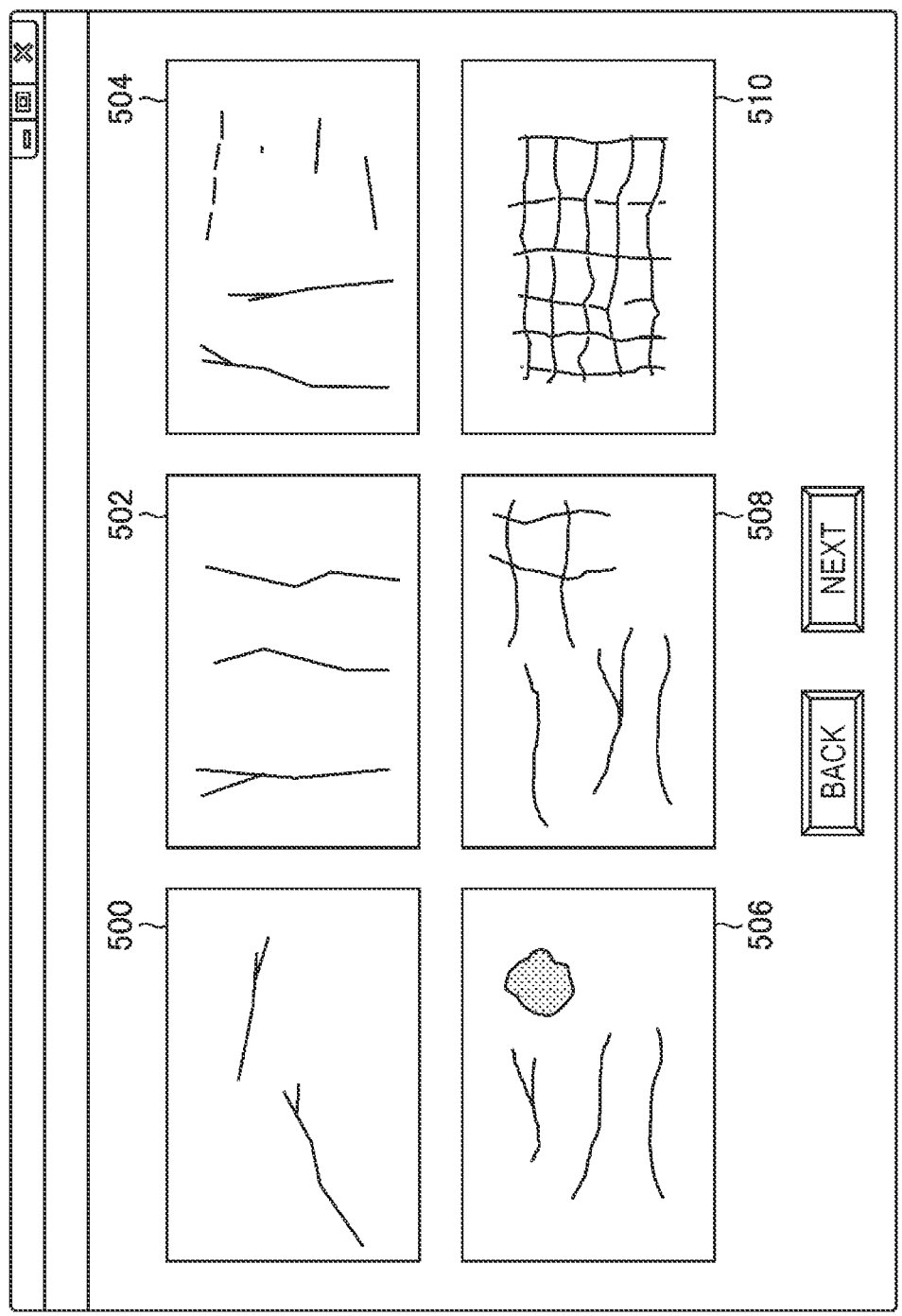
FIG. 5 illustrates examples in which a list of damage images is displayed.

The first display control unit 104 causes the display device 20 (display device) to display the selected pieces of damage information in the form of a list (step S110: first display control step). FIG. 5 illustrates a state where a list of damage images 500 to 510 is displayed as examples of the pieces of damage information. A damage image may be an image on which information indicating damage (e.g., a line segment representing a crack, a circumcircle or a circumscribed rectangle of a peeling area, a figure or a symbol indicating the position of the damage, or the like) is superposed. In addition, the storage unit 200 may store the image and information on damage indicated by the image (e.g., type, member, section, position, size, or degree) in association with each other, and the first display control unit 104 may display both the image and the information associated with the image.

<Display Damage Number Table>

FIG. 6 illustrates a state where a damage number table is displayed as an example of the damage information. In FIG. 6, a member in which damage has occurred, the type of damage, and the degree of damage are displayed in association with one another. Note that the degree of damage can be determined on the basis of "Bridge Regular Inspection Outline" by the Ministry of Land, Infrastructure, Transport and Tourism.

<Other Damage Information>

Figure 13A:
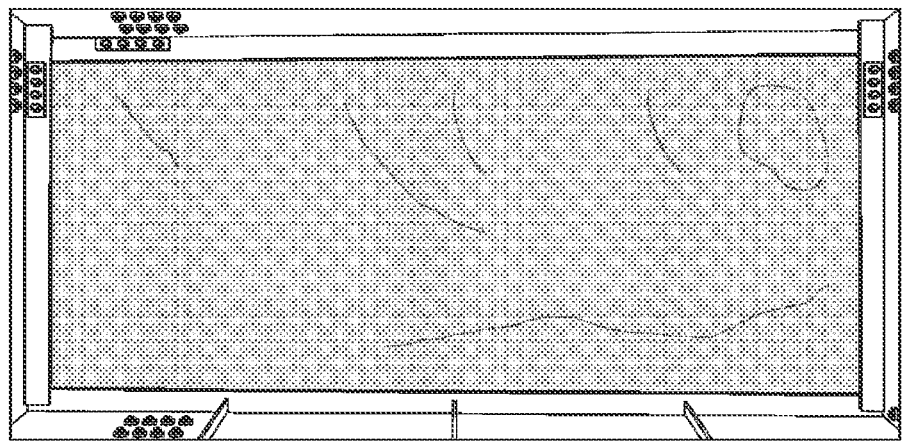
FIGS. 13A to 13C illustrate other examples of the damage information.
Figure 13B:
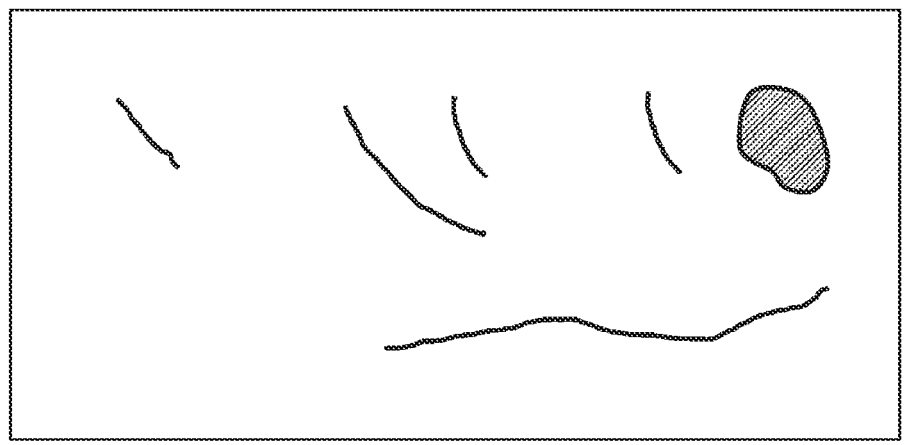
Figure 13C:
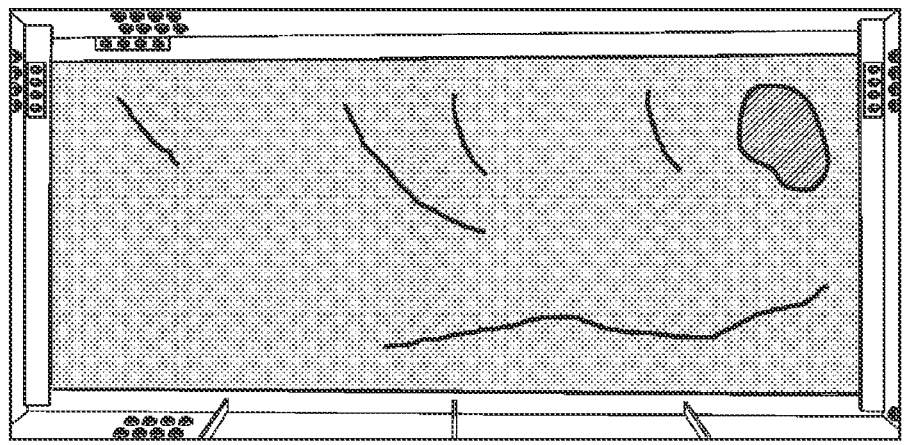

Although FIGS. 5 and 6 illustrate examples of the damage image and the damage data table as an embodiment of the damage information, the damage image to be displayed in the form of a list may be an ortho-image (see FIG. 13A), a damage figure (see FIG. 13B), or "ortho-image+damage figure" (FIG. 13C). In addition, the damage information may be a repair figure or a repair number table.

<Display Damage Information Again>

The first display control unit 104 determines whether to set again display conditions of the damage information displayed in the form of the list (step S120: first display control step). If the acceptance unit 108 (acceptance unit, acceptance function) accepts an operation for setting the display conditions via the operating unit 400, the first display control unit 104 can determine to "set the display conditions again". For example, a user can perform an operation for setting the display conditions via the screen in FIG. 7 displayed on the display device 20. In the example in FIG. 7, at least one of the part and/or the member of the structure, the type of damage, the degree of damage, or the date and time on and at which the damage information is acquired (e.g., imaging date and time) can be sorted in the ascending or descending order, and damage with a degree that is higher than or equal to or lower than or equal to a threshold value can be extracted.

To set the display conditions again (YES in step S120), on the basis of the setting operation accepted by the acceptance unit 108, the first display control unit 104 causes the display device 20 to display the damage information that satisfies the display conditions that are set again (step S130: first display control step). FIG. 8 illustrates an example in which damage with degrees c and d is extracted from the table in FIG. 6. In this manner, since the display conditions are set again and displayed again, from the damage information associated with the three-dimensional model, only information in which a user is interested can be caused to be displayed by the user.

<Select Damage Information>

The acceptance unit 108 determines whether selection of the damage information that is displayed in the form of the list in steps S110 and S130 is accepted (step S140: acceptance step). In response to a user operation for selection via the operating unit 400 (e.g., an operation of clicking an image or damage information with the mouse 420), the acceptance unit 108 can determine that "selection is accepted".

<Determine Three-Dimensional Position>

The management section determining unit 110 (management section determining unit, management section determining function) determines a three-dimensional position on the three-dimensional model, the three-dimensional position corresponding to the damage information for which selection is accepted (step S150: three-dimensional position determining step, management section determining step). For example, the management section determining unit 110 may store, in the storage unit 200, the table illustrated in FIG. 9 in which the damage information and three-dimensional coordinates of representative points of damage are associated with each other and may determine the three-dimensional position by referring to this table. Cells of representative points and management sections may be provided in the table of the damage information in FIG. 6, and the table of the damage information and the table for determining the management section may be used in common. Note that, for example, a start point, an end point, an intermediate point, the center of a circumscribed rectangle or circumcircle, or the like of damage may be set as a representative point of the damage, and the representative point may be measured by, for example, a stereo camera, a GPS (Global Positioning System), or a ToF (Time of Flight) method using a laser.

<Determine Management Section>

The management section determining unit 110 determines a management section including the three-dimensional position determined in step S150 (step S160: management section determining step). The management section is at least one of a part constituting a structure, a section of an inspection unit of a member, or three-dimensional coordinates in a structure. For example, in a case of a bridge, the management section may be a member such as a deck slab, a pier, an abutment, a main girder, or a cross beam. In addition, for example, the management section may be an inspection unit obtained by dividing a member into small parts, such as a coffer of the deck slab, or three-dimensional coordinates of a point on the bridge. If a plurality of identical members are present (e.g., piers), the management section may be set for each of the members. For example, the management section determining unit 110 can determine the management section by referring to the correspondence table of the three-dimensional position and the management section in FIG. 9.

<Display Damage Information and Three-Dimensional Model>

The second display control unit 106 (second display control unit, second display control function) causes the display device 20 to display an area of the three-dimensional model including at least the management section determined in step S160 in a manner that the determined three-dimensional position is distinguishable (step S170: second display control step). The term "distinguishable" herein includes, not only a case where the three-dimensional position determined in step S150 is pinpointedly distinguishable (exactly at one point), but also a case where a brief position of the determined three-dimensional position or a region including the three-dimensional position is displayed in an understandable manner. The information display system 1 repeats the processing from step S100 to S170 until the processing ends (YES in step S180) in response to an instruction from a user or the like via the operating unit 400.

<First and Second Display States>

The second display control unit 106 causes the three-dimensional model to be displayed in a first display state where the three-dimensional position and/or the area is displayed in a distinguishable manner and/or in a second display state where a perspective position and/or a line-of-sight direction for the three-dimensional position is controlled (step S170: second display control step). The first display state is an embodiment in which an index indicating the three-dimensional position determined in step S150 and/or the area including the management section is displayed on the three-dimensional model in a superposed manner, and, in the second display state, the three-dimensional model is displayed by using a perspective position and a line-of-sight direction facing the three-dimensional position determined in step S150.

<Display Examples of Three-Dimensional Model>

Figure 10:
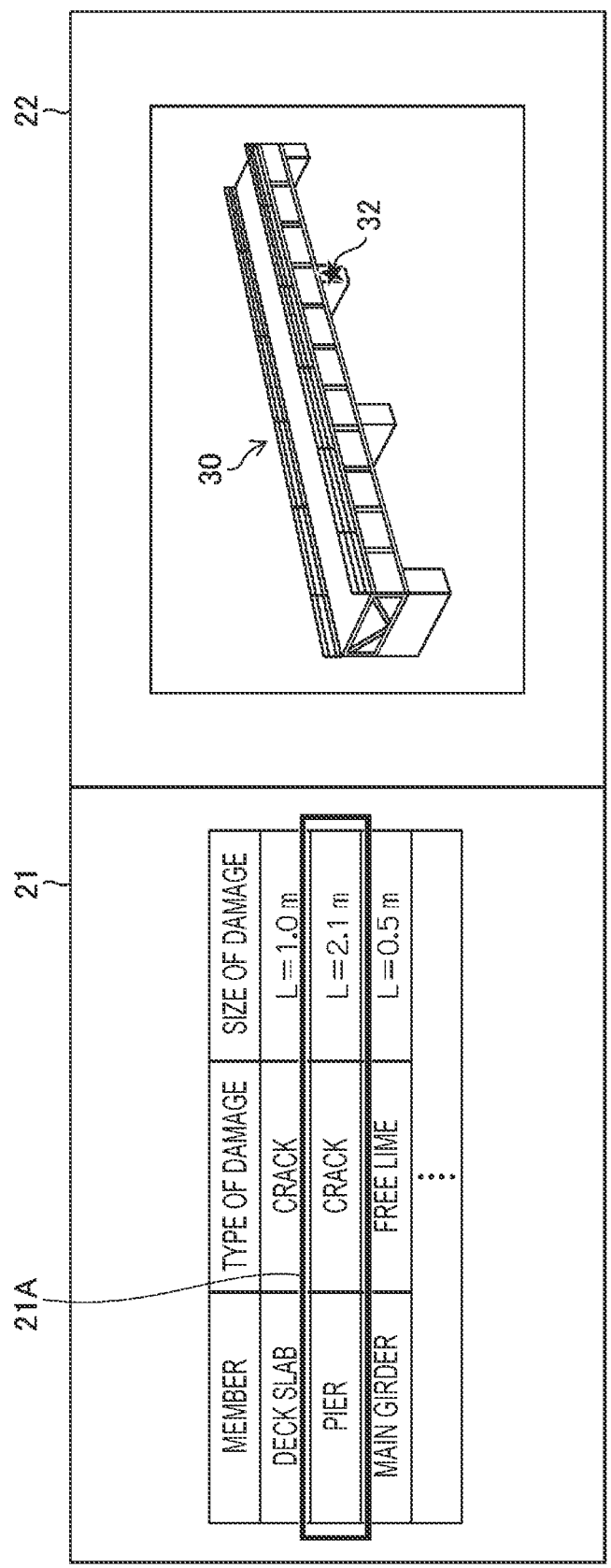
FIG. 10 illustrates an example in which a three-dimensional position is displayed in a highlighted manner.

FIG. 10 illustrates an example in which the damage information and the three-dimensional model are displayed in the first display state. In the example in FIG. 10, the first display control unit 104 causes the damage information to be displayed in a first display region 21 (first display region) of the display device 20 (it is assumed that damage information 21A is selected), and the second display control unit 106 causes a three-dimensional model 30 of a bridge to be displayed in a second display region 22 (second display region) of the display device 20. In the three-dimensional model 30 of the bridge, the area including the management section determined in step S160 is displayed in the second display region 22. In addition, the second display control unit 106 causes an index 32 indicating the determined three-dimensional position to be displayed to be superposed on the three-dimensional model. Such display in a superposed manner enables the user to easily view and distinguish the position of the selected damage on the three-dimensional model. Note that the second display control unit 106 can cause, for example, a model obtained by texture mapping of a captured image (texture) of the structure on polygons to be displayed as the three-dimensional model. The user can enlarge such a three-dimensional model in the display and can check the properties and characteristics of the surface of the bridge (coffer).

Figure 11:
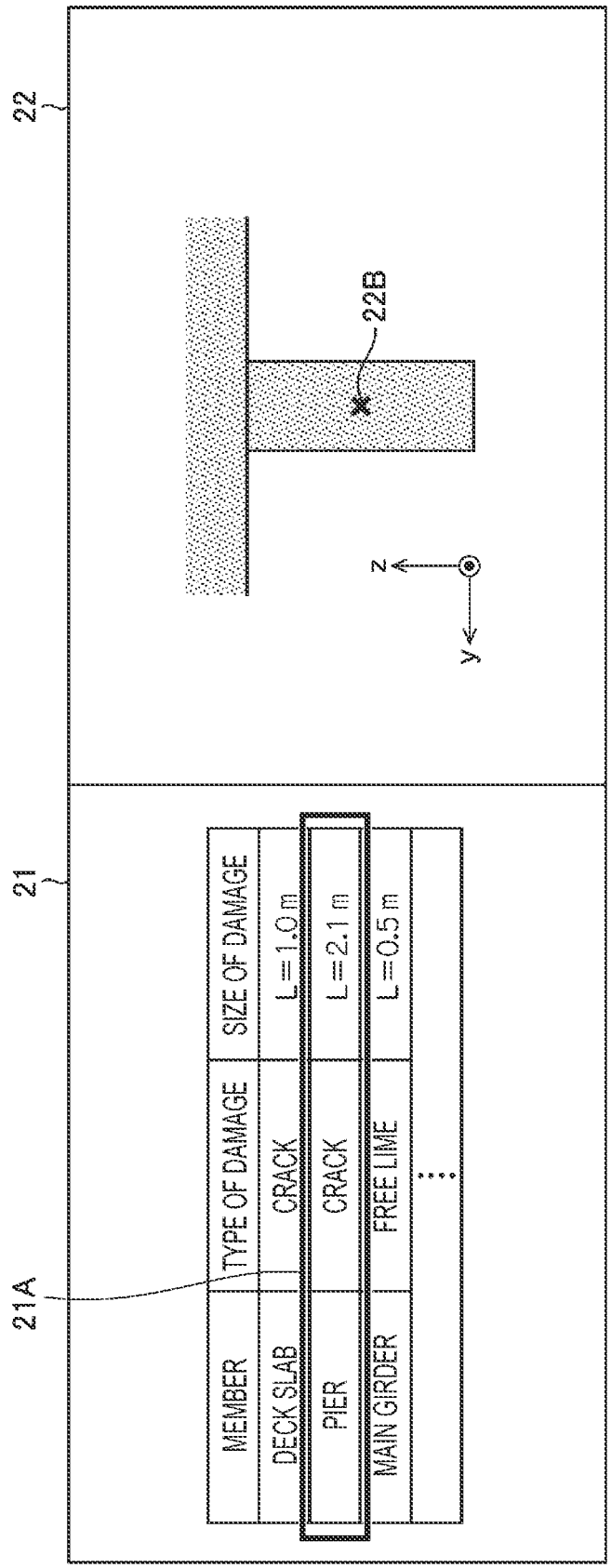
FIG. 11 illustrates an example in which a three-dimensional position when viewed from the front is displayed.

FIG. 11 illustrates a display example in the second display state. In the example in FIG. 11, on the basis of the determined three-dimensional position, the second display control unit 106 controls the perspective position and/or the line-of-sight direction for the three-dimensional position by enlarging, shrinking, translating, or rotating the three-dimensional model and causes the three-dimensional model to be displayed in the second display region 22 by using the perspective position and/or the line-of-sight direction for the three-dimensional position facing a determined three-dimensional position 22B. Note that the second display control unit 106 can control the perspective position and/or the line-of-sight direction for the three-dimensional position through calculation such as multiplication of a coordinate transformation matrix on the basis of the three-dimensional position (x, y, z) and plane information (normal vector) as in the following Expression (1).

[Math 1]

$$\begin{pmatrix} X \\ Y \\ Z \end{pmatrix} = \begin{pmatrix} \cos\gamma & \sin\gamma & 0 \\ -\sin\gamma & \cos\gamma & 0 \\ 0 & 0 & 1 \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} 1 & 0 & 0 \\ 0 & \cos\alpha & \sin\alpha \\ 0 & -\sin\alpha & \cos\alpha \end{pmatrix} \begin{pmatrix} x \\ y \\ z \end{pmatrix} \quad (1)$$

In Expression (1), the rotation angle is ($\alpha$, $\beta$, $\gamma$), original coordinates are (x, y, z), and coordinates after transformation are (X, Y, Z).

Figure 12A:
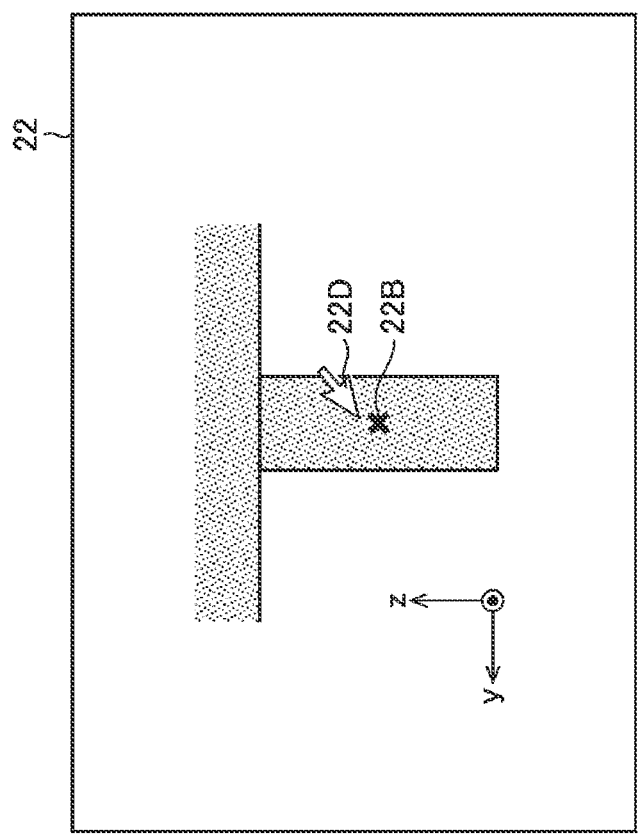
FIGS. 12A and 12B illustrate other examples of display in a distinguishable manner.
Figure 12B:
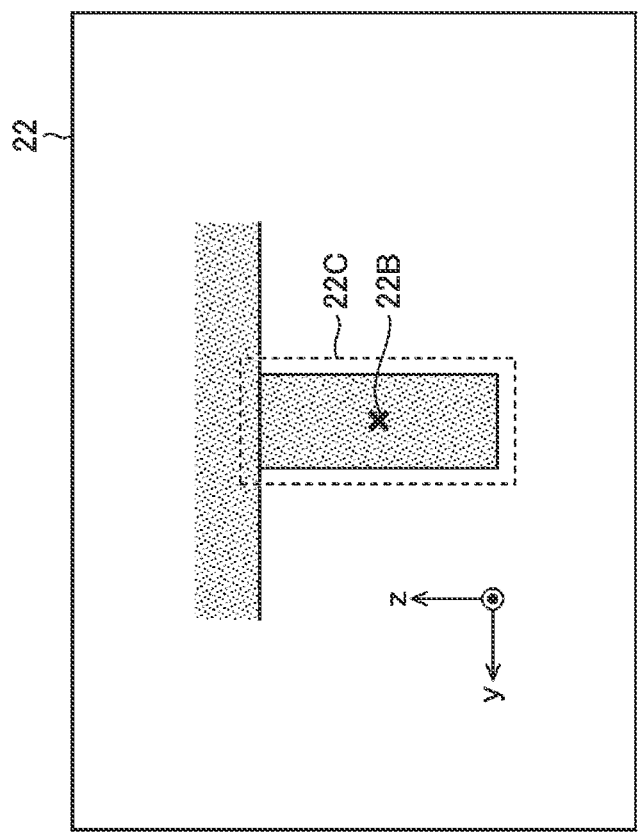

Only either one of the above first display state and the second display state may be used, or both may be used at the same time. For example, as illustrated in FIG. 12A, at the perspective position and the line-of-sight direction facing the three-dimensional position 22B (i.e., in a state where the three-dimensional model is moved and enlarged, for example), a frame 22C (an embodiment of the index) indicating a management section including the three-dimensional position 22B may be displayed in a superposed manner. In addition, as illustrated in FIG. 12B, at the perspective position and the line-of-sight direction facing the three-dimensional position 22B, an index 22D indicating the three-dimensional position 22B may be displayed in a superposed manner. Note that only the second display region 22 is illustrated in FIGS. 12A and 12B.

Figure 4:
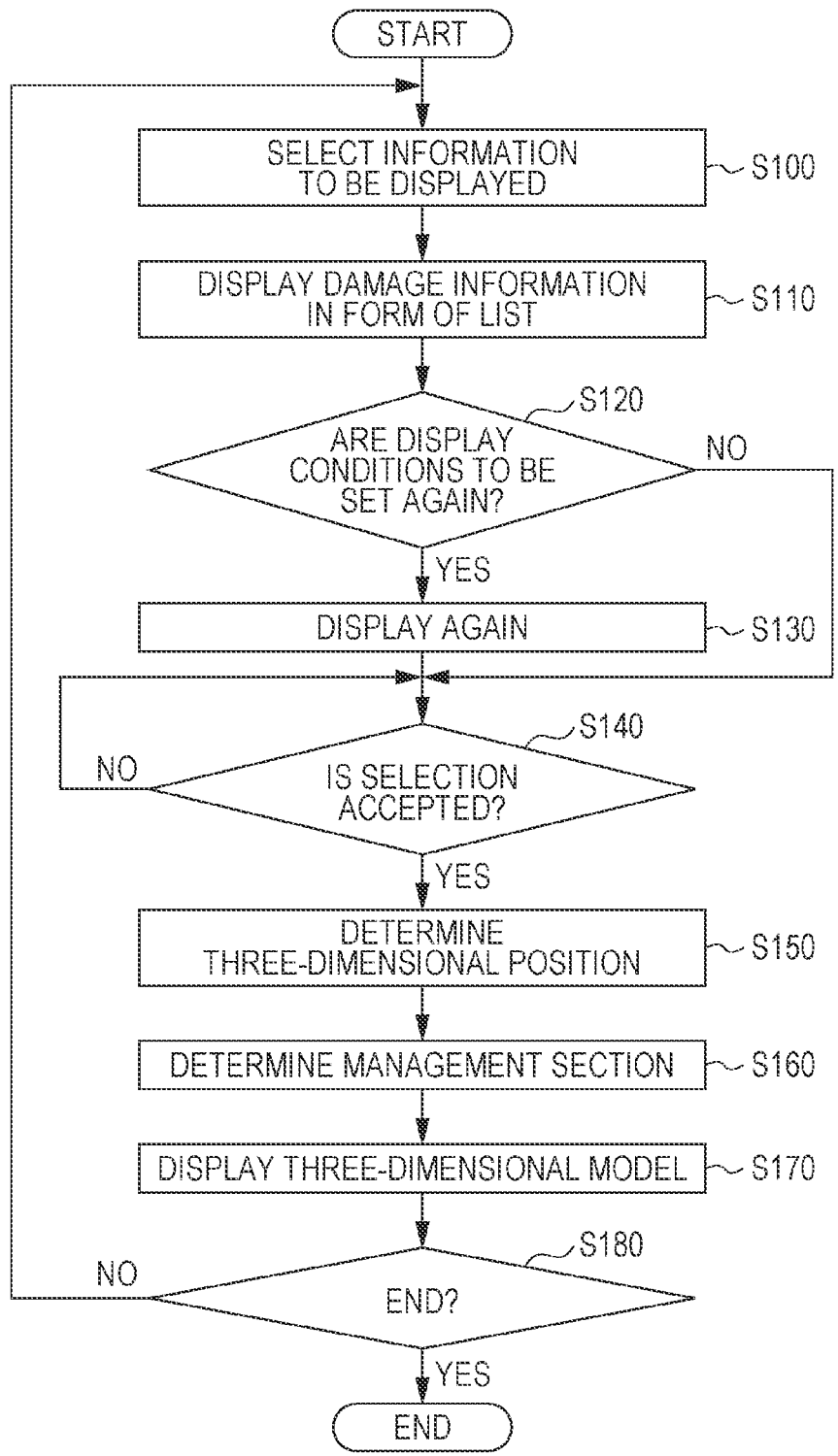
FIG. 4 is a flowchart illustrating processing of an information display method.

Note that the three-dimensional model is displayed in step S170 in the embodiment illustrated in the flowchart in FIG. 4. However, the three-dimensional model may also be displayed with the position, size, and direction according to initial settings at the start of the processing (in step S100 or step S110), and may be displayed again in response to selection of damage information (the three-dimensional model in the initial state may be moved, rotated, or enlarged/shrunk, for example).

<Display Damage Information in Accordance with Designation of Three-Dimensional Position>

Figure 14:
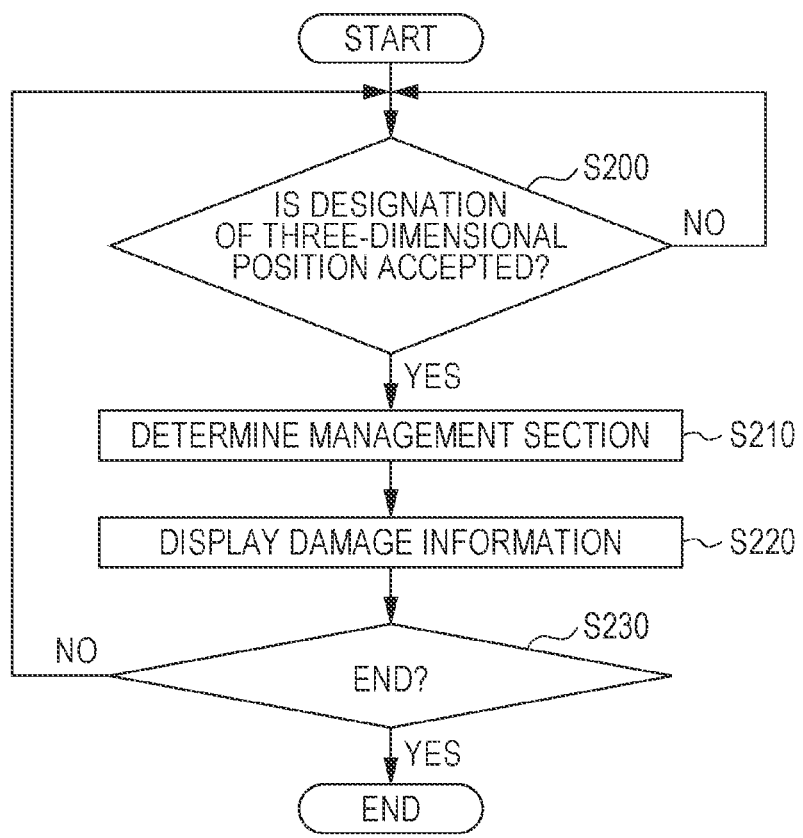
FIG. 14 is a flowchart for displaying damage information of a position selected on a three-dimensional model.

In the present invention, not only the three-dimensional model is displayed on the basis of selection of damage information as described above with reference to FIG. 4 and the like, but also, on the contrary, damage information may be displayed on the basis of designation of a three-dimensional position on the three-dimensional model. The following description refers to the flowchart in FIG. 14.

Figure 15:
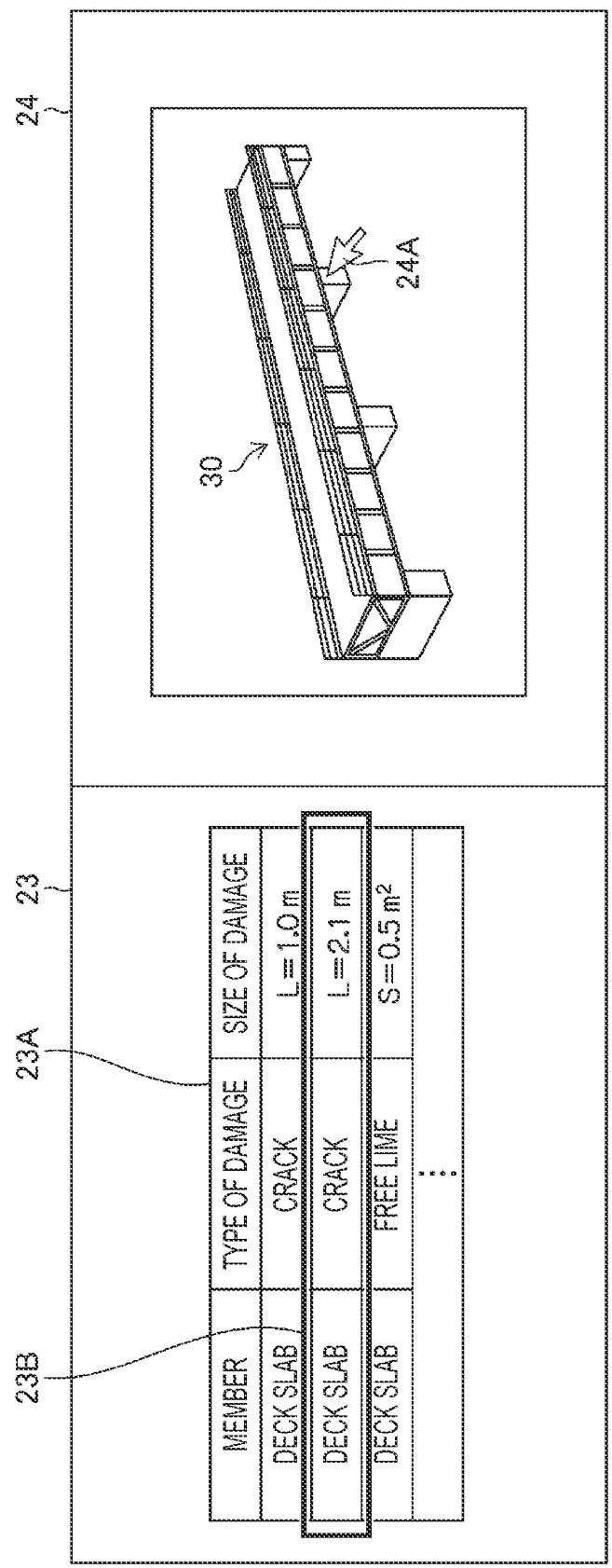
FIG. 15 illustrates a state where damage information of a position selected on a three-dimensional model is displayed.

The acceptance unit 108 determines whether designation of a three-dimensional position is accepted (step S200). This determination can be performed on the basis of the presence or absence of an operation for designating a three-dimensional position via the operating unit 400 (e.g., clicking a position on the three-dimensional model with the mouse 420). If the acceptance unit 108 accepts designation (YES in step S200), the management section determining unit 110 determines a management section to which damage having a representative point that is the closest to the designated three-dimensional position belongs (step S210). The management section determining unit 110 can perform this determination by referring to the correspondence table in FIG. 9. The first display control unit 104 causes the display device 20 to display damage information that is present in the determined management section (damage information corresponding to the designated three-dimensional position) (step S220). Damage information near the determined management section (in an adjacent section or the like) may also be displayed together. FIG. 15 illustrates a display example of damage information in accordance with designation of the three-dimensional position. When a user performs an operation for designating the three-dimensional position with a cursor 24A (this can be performed with the mouse 420 or the like) on the three-dimensional model 30 displayed in a second display region 24 in the right of the drawing, the first display control unit 104 causes damage information 23A to be displayed in a first display region 23 in the left of the drawing. Note that, in the damage information 23A, the information surrounded by a frame 23B corresponds to damage that is the closest to the designated three-dimensional position. With such display, the user can check the damage information of the management section including the position designated on the three-dimensional model.

<Switch Display>

Figure 16:
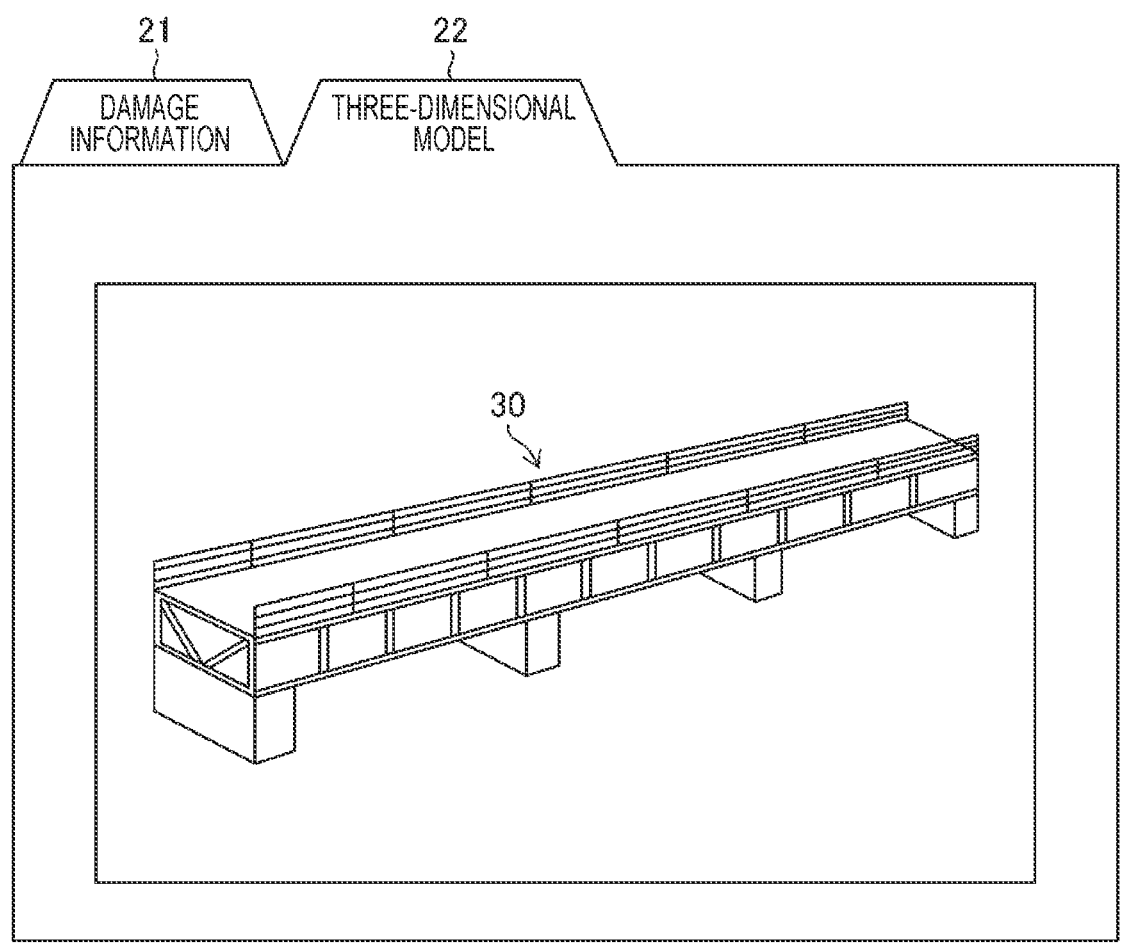
FIG. 16 illustrates a state where display of the damage information and the three-dimensional model is switched.

Although FIGS. 10 to 12A and 12B illustrate an embodiment in which both damage information and a three-dimensional model are displayed at the same time, the display switching unit 112 (see FIG. 2) may switch display of these. FIG. 16 illustrates an example of switching display and illustrates a state where the first display region 21 displaying the damage information in the form of a list and the second display region 22 displaying the three-dimensional model are overlapped (in a case where the second display region 22 is the front). When a user selects either display region tab by an operation via the operating unit 400, the display switching unit 112 switches display on the display device 20 in accordance with the selection.

As described above, according to the present invention, a user can quickly and easily grasp the position of damage of interest on the three-dimensional model.

Although embodiments of the present invention have been described above, the present invention is not limited to the above embodiments, and various modifications can be made without departing from the spirit of the present invention.

REFERENCE SIGNS LIST

1 information display system
10 information display device
20 display device
21 first display region
21A damage information
22 second display region
22B three-dimensional position
22C frame
22D index
23 first display region
23A damage information
23B frame
24 second display region
24A cursor
30 three-dimensional model
32 index
100 processing unit
102 storage control unit
104 first display control unit
106 second display control unit
108 acceptance unit
110 management section determining unit
112 display switching unit
114 communication control unit
200 storage unit
202 three-dimensional model
204 damage information
400 operating unit
410 keyboard
420 mouse
500 damage image
502 damage image
504 damage image
506 damage image
508 damage image
510 damage image
S100 to S180 steps in information display method
S200 to S230 steps in information display method

What is claimed is:

1. An information display device comprising:
   a non-transitory and tangible recording medium that stores a three-dimensional model of a structure and damage information of each management section of the structure in association with each other; and
   a processor that performs:
      a first display control of causing a display device to display the damage information in a form of a list, the list identifying the damage information using a table that includes information selected from the group consisting of a member where damage is present, a type of damage, a size of damage, or a degree of damage,
      an acceptance of accepting selection of the damage information that is displayed in the form of the list,
      a management section determining of determining a three-dimensional position on the three-dimensional model, the three-dimensional position corresponding to the damage information for which the selection is accepted, and determining a management section including the determined three-dimensional position, and a second display control of causing the display device to display an area of the three-dimensional model including at least the determined management section in a manner that the three-dimensional position is distinguishable,
wherein in the second display control, the processor causes in accordance with the selected three-dimensional position corresponding to the damage information, the three-dimensional model to be enlarged, shrunk, translated, or rotated on the basis of the three-dimensional position, and causes the area to be displayed in a first display state where the three-dimensional position and/or the area is displayed in a distinguishable manner and/or in a second display state where a perspective position and/or a line-of-sight direction for the three-dimensional position is controlled.

2. The information display device according to claim 1, wherein the processor causes an index indicating the three-dimensional position and/or the area to be displayed on the three-dimensional model in a superposed manner in the first display state.

3. The information display device according to claim 2, wherein the processor causes the three-dimensional model to be displayed by using a perspective position and a line-of-sight direction facing the three-dimensional position in the second display state.

4. The information display device according to claim 3, wherein the processor:
causes the damage information to be displayed in a first display region of the display device, and
causes the three-dimensional model to be displayed in a second display region of the display device.

5. The information display device according to claim 2, wherein the processor:
causes the damage information to be displayed in a first display region of the display device, and
causes the three-dimensional model to be displayed in a second display region of the display device.

6. The information display device according to claim 1, wherein the processor causes the three-dimensional model to be displayed by using a perspective position and a line-of-sight direction facing the three-dimensional position in the second display state.

7. The information display device according to claim 6, wherein the processor:
causes the damage information to be displayed in a first display region of the display device, and
causes the three-dimensional model to be displayed in a second display region of the display device.

8. The information display device according to claim 1, wherein the processor:
causes the damage information to be displayed in a first display region of the display device, and
causes the three-dimensional model to be displayed in a second display region of the display device.

9. The information display device according to claim 1, wherein
the processor switches between display of the damage information caused by the first display control and display of the three-dimensional model caused by the second display control.

10. The information display device according to claim 1, wherein the processor:
accepts a setting operation of display conditions of the list, and
causes the display device to display the damage information satisfying the display conditions on the basis of the setting operation that is accepted.

11. The information display device according to claim 10, wherein the processor accepts, as the setting operation, setting of at least one of a part and/or a member of the structure, a type of damage, a degree of damage, or a date and time on and at which the damage information is acquired.

12. The information display device according to claim 1, wherein the damage information includes at least one of a damage image corresponding to the management section, a damage image on which information indicating damage is superposed, a damage figure, or a repair figure.

13. The information display device according to claim 1, wherein the management section is at least one of a part constituting the structure, a section of an inspection unit of a member of the structure, or three-dimensional coordinates in the structure.

14. The information display device according to claim 1, wherein the processor accepts designation of a three-dimensional position on the three-dimensional model, and causes the display device to display damage information corresponding to the three-dimensional position for which the designation is accepted.

15. The information display device according to claim 1, wherein the table is a damage number table or a repair number table.

16. An information display method comprising:
causing a display device to display damage information of each management section of a structure in a form of a list, the list identifying the damage information using a table that includes information selected from the group consisting of a member where damage is present, a type of damage, a size of damage, or a degree of damage;
accepting selection of the damage information that is displayed in the form of the list;
determining a three-dimensional position on the three-dimensional model of the structure, the three-dimensional position corresponding to the damage information for which the selection is accepted, and determining a management section including the determined three-dimensional position;
causing the display device to display an area of the three-dimensional model including at least the determined management section in a manner that the three-dimensional position is distinguishable;
causing in accordance with the selected three-dimensional position corresponding to the damage information, the three-dimensional model to be enlarged, shrunk, translated, or rotated on the basis of the three-dimensional position; and
causing the area to be displayed in a first display state where the three-dimensional position and/or the area is displayed in a distinguishable manner and/or in a second display state where a perspective position and/or a line-of-sight direction for the three-dimensional position is controlled.

17. A non-transitory computer readable recording medium storing an information display program for causing a computer to execute:
causing a display device to display damage information of each management section of a structure in a form of a list, the list identifying the damage information using a table that includes information selected from the group consisting of a member where damage is present, a type of damage, a size of damage, or a degree of damage;

accepting selection of the damage information that is displayed in the form of the list;

determining function of determining a three-dimensional position on the three-dimensional model of the structure, the three-dimensional position corresponding to the damage information for which the selection is accepted, and determining a management section including the determined three-dimensional position;

causing the display device to display an area of the three-dimensional model including at least the determined management section in a manner that the three-dimensional position is distinguishable;

causing in accordance with the selected three-dimensional position corresponding to the damage information, the three-dimensional model to be enlarged, shrunk, translated, or rotated on the basis of the three-dimensional position; and causing the area to be displayed in a first display state where the three-dimensional position and/or the area is displayed in a distinguishable manner and/or in a second display state where a perspective position and/or a line-of-sight direction for the three-dimensional position is controlled.

* * * * *